United States Patent
Chandraker et al.

(10) Patent No.: US 9,367,922 B2
(45) Date of Patent: Jun. 14, 2016

(54) HIGH ACCURACY MONOCULAR MOVING OBJECT LOCALIZATION

(71) Applicant: NEC Laboratories America, Inc., Princeton, NJ (US)

(72) Inventors: Manmohan Chandraker, Santa Clara, CA (US); Shiyu Song, Santa Clara, CA (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/639,536

(22) Filed: Mar. 5, 2015

(65) Prior Publication Data

US 2015/0254834 A1    Sep. 10, 2015

Related U.S. Application Data

(60) Provisional application No. 61/948,981, filed on Mar. 6, 2014, provisional application No. 62/128,347, filed on Mar. 4, 2015.

(51) Int. Cl.
*G06T 7/00*    (2006.01)

(52) U.S. Cl.
CPC .......... *G06T 7/0071* (2013.01); *G06T 7/0042* (2013.01); *G06T 2207/10016* (2013.01); *G06T 2207/10028* (2013.01)

(58) Field of Classification Search
CPC ............... G06T 2207/10016; G06T 7/0071; G06T 7/0042; G06T 2207/10028; G06T 7/2033; G06T 19/00; G06K 9/00791; G06K 9/46; G06K 9/00805; H04N 13/0271

See application file for complete search history.

(56) References Cited

U.S. PATENT DOCUMENTS

2008/0167814 A1*    7/2008    Samarasekera ...... G01C 21/005
                                                    701/469
2011/0279685 A1     11/2011   Alahi et al.

FOREIGN PATENT DOCUMENTS

CN             103247075 A      8/2013

OTHER PUBLICATIONS

Live dense reconstruction with a single moving camera Newcombe, Richard A.; Davison, A.J. Computer Vision and Pattern Recognition (CVPR), 2010 IEEE Conference on Year: 2010, pp. 1498-1505.*

Robust Multiperson Tracking from a Mobile Platform Ess, A.; Leibe, B.; Schindler, K.; Van Gool, L. Pattern Analysis and Machine Intelligence, IEEE Transactions on Year: 2009, vol. 31, Issue: 10 pp. 1831-1846.*

Choi, W. et al., "Multiple Target Tracking in World Coordinate With Single, Minimally Calibrated Camera," ECCV'10 Proceedings of the 11th European conference on Computer vision: Part IV, Sep. 2010. pp. 553-567.

(Continued)

*Primary Examiner* — Kim Vu
*Assistant Examiner* — Michael Vanchy, Jr.
(74) *Attorney, Agent, or Firm* — Joseph Kolodka

(57)    ABSTRACT

Methods and systems for moving object localization include estimating a ground plane in a video frame based on a detected object within the video frame and monocular structure-from-motion (SFM) information; computing object pose for objects in the frame based on the SFM information using dense feature tracking; and determining a three-dimensional location for the detected object based on the estimated ground plane and the computed object pose.

8 Claims, 3 Drawing Sheets

(56) References Cited

OTHER PUBLICATIONS

Kundu, A. et al., "Realtime Multibody Visual Slam With a Smoothly Moving Monocular Camera," Computer Vision (ICCV), 2011 IEEE International Conference. Nov. 2011. pp. 1-8.

Newcombe, R.A., et al., "Live Dense Reconstruction with a Single Moving Camera" In Computer Vision and Pattern Recognition (CVPR), 2010 IEEE Conference, San Francisco, CA, Jun. 13-18, 2010.

* cited by examiner

HIGH ACCURACY MONOCULAR MOVING OBJECT LOCALIZATION

RELATED APPLICATION INFORMATION

This application claims priority to provisional application No. 61/948,981, filed Mar. 6, 2014, and provisional application No. 62/128,347, filed Mar. 4, 2015, and the contents thereof are incorporated herein by reference.

BACKGROUND OF THE INVENTION

Three-dimensional localization of moving objects in a video stream using only a single camera can be difficult. In particular, existing methods use sparse feature points, but this technique is difficult to use on objects such as, e.g., cars, because it is hard to establish stable feature tracks. Other existing methods triangulate object bounding boxes against a fixed ground plane, which leads to high localization errors. These existing techniques may also involve expensive inference mechanisms.

BRIEF SUMMARY OF THE INVENTION

A method for moving object localization includes estimating a ground plane in a video frame based on a detected object within the video frame and monocular structure-from-motion (SFM) information. Object pose for objects in the frame is computed based on the SFM information using dense feature tracking. A three-dimensional location for the detected object is determined based on the estimated ground plane and the computed object pose.

A system for moving object localization includes a processor configured to estimate a ground plane in a video frame based on a detected object within the video frame and monocular structure-from-motion (SFM) information, to compute object pose for objects in the frame based on the SFM information using dense feature tracking, and to determine a three-dimensional location for the detected object based on the estimated ground plane and the computed object pose.

DETAILED DESCRIPTION

Embodiments of the present invention use monocular structure-from-motion (SFM) to adaptively estimate a ground plane by combining cues from SFM, dense interframe stereo, and object detection. Object pose is estimated by intensity alignment, since pose estimation based on very few sparse features is unstable. Dense features are tracked using a one-dimensional optical flow mechanism that imposes epipolar constraints. Outliers in the tracks are eliminated using the estimated object pose. The SFM cues employed by the present embodiments minimize reprojection errors of the tracked three-dimensional points, while an object detection cue fits the best three-dimensional bounding box that is most consistent with a sequence of two-dimensional bounding boxes having detection scores that are highest in relation to the object tracking output.

The present embodiments provide superior accuracy in object localization by using a variety of cues. In addition, the localization is more stable due to the use of dense tracking and intensity alignment for pose computation, and is performed more quickly because motion segmentation and complex inference are not used.

Figure 1:
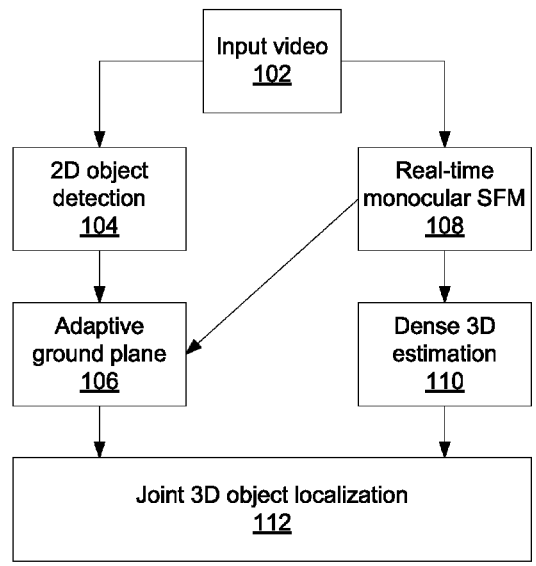
FIG. 1 is a block/flow diagram of object localization in accordance with the present principles.

Referring now to FIG. 1, a block diagram of object localization is shown. An input video 102 is used in conventional 2D object detection 104 and adaptive ground plane detection 106. In addition, real-time monocular SFM 108 is used to inform both the adaptive ground plane detection 106 as well as dense 3D estimation 110 The results of the 2D object detection 104, the adaptive ground plane detection 106, and the dense 3D estimation 110 are used in joint 3D object localization 112 to determine a location of an object in three dimensions.

Figure 2:
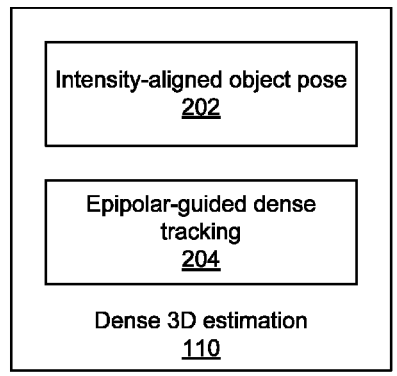
FIG. 2 is a block diagram of dense three-dimensional estimation in accordance with the present principles.

Referring now to FIG. 2, a more detailed view of the dense 3D estimation 110 is shown. Dense 3D estimation 110 uses intensity-aligned object pose computations 202 and epipolar-guided dense tracking 204.

For intensity-aligned object pose computation 202, an object's pose is defined by the vector $\Omega=(x_0, z_0, \psi, \theta, \phi, h)^T$, where $x_0$ and $z_0$ are coordinates of the object's origin in the camera's coordinates, corresponding to the center of the line where the back plane of the object intersects the ground, $\psi$, $\theta$, and $\phi$ are pitch, roll, and yaw angles of the object, and h is the height of the camera from the ground plane. Given an object pose at time t, the pose at time t+1 is determined as the one that best aligns the intensities I at all pixels in the projected image according to:

$$\min_{\Omega_{t+1}} \sum_{i=1}^{N} (I_t(\pi_{\Omega_t}(x_i)) - I_{t+1}(\pi_{\Omega_{t+1}}(x_i)))^2$$

where $\pi_\Omega$ stands for the projection of a 3D point in object coordinates to the 2D image plane.

Epipolar-guided dense tracking 204 estimates TV-L1 regularized optical flow between frames t and t+1. Flow estimation is performed only within the detection bounding boxes to maximize computational efficiency. The optical flow vectors are constrained to satisfy epipolar geometry. This is used to reduce the optical flow problem from a two-dimensional search to a one-dimensional search. The feature tracks are validated and triangulated. The optical flow problem may be expressed as:

$$E = \int_\Omega [\lambda |I_0(x) - I_1(x+p_0+up)| + \nabla up] dx$$

where x is an image location, $p_0$ is a point on the image, p is the direction of an epipolar line through $p_0$, and u is the distance along the epipolar line.

Figure 3:
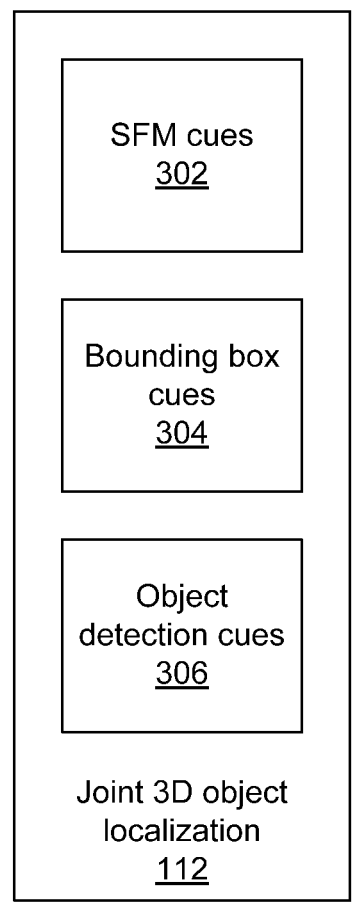
FIG. 3 is a block diagram of joint three-dimensional object localization in accordance with the present principles.

Referring now to FIG. 3, additional detail on joint optimization for 3D object localization 112 is shown. A cost function incorporates costs from object bounding boxes, SFM, object detection, and priors from ground plane estimation, trajectory smoothness, and object size. A Levenberg-Marquardt optimization is performed to find the best 3D bounding box that minimizes the cost function:

$$\epsilon = \epsilon'_{SFM} + \lambda_o \epsilon'_{obj} + \lambda_p \epsilon'_{prior}$$

where $\epsilon'_{SFM}$ is a cost from SFM, $\epsilon'_{obj}$ is a cost from object bounding boxes, and $\epsilon'_{prior}$ is a prior from the combined smoothness and object size priors. Exemplary parameter values may be $\lambda_o=0.7$ and $\lambda_p=2.7$. The quantity $\epsilon'_{obj}$ is defined as:

$$\epsilon'_{obj} = \epsilon'_{box} + \lambda_d \epsilon'_{det}$$

where $\epsilon'_{box}$ is an object bounding box error, $\epsilon'_{det}$ is a detection cost, and the parameter $\lambda_d$ has an exemplary value of 0.03. The quantity $\epsilon'_{prior}$ is defined as:

$$\epsilon'_{prior} = \epsilon'_{smooth} + \lambda_s \epsilon'_{size}$$

where $\epsilon'_{smooth}$ is a trajectory smoothness prior, $\epsilon'_{size}$ is an object size prior, and an exemplary value for the parameter is $\lambda_s=0.03$.

3D Object localization 112 uses SFM cues 302, bounding box cues 304, and object detection cues 306. Finding object localization cost from SFM cues in block 302 tracks $i=1, \ldots, N$ objects in a scene, with $j=1, \ldots, M$ features on each object to be tracked in frames $t=s_i, \ldots, e_i$, where $s_i$ and $e_i$ are the first and last frames of the object i. Then, if $\bar{u}_j^t = (\bar{u}_j^t, \bar{v}_j^t)^T$ is the observed projection and $\bar{u}_j^t = (u_j^t, v_j^t)$ is the matched 2D pixel in frame t, an SFM reprojection error for the feature tracks may be defined as:

$$E_{SFM} = \sum_{i=1}^{N} \sum_{t=s_i}^{e_i} \sum_{j=1}^{M} (u_j^t - \bar{u}_j^t)^2 + (v_j^t - \bar{v}_j^t)^2$$

where u and v are the coordinates of a 2D pixel on the image plane.

Defining $N=[n_\alpha, n_\beta, n_\gamma]$, where $n_\gamma = (-n_1, n_3, -n_2)^T$, $n_\beta = -n$, and $n_\alpha = n_\beta \times n_\gamma$, then given a 3D point $\tilde{x}_0$ in the object coordinate system, the transformation from object to camera coordinates is given by $\tilde{x}_c = P_\pi P_\psi \tilde{x}_0$, with:

$$P_\pi = \begin{bmatrix} N & c_o \\ 0^T & 1 \end{bmatrix},$$

$$P_\psi = \begin{bmatrix} e^{[\omega_\psi]_\times} & 0 \\ 0^T & 1 \end{bmatrix}$$

where $\omega_\psi = (0, \psi, 0)^T$ and $[.]_\times$ is a cross product matrix. The formulation to project a 3D point $\tilde{x}_0$ in the object coordinate system is then given by the homogeneous relation:

$$\lambda \tilde{u} = K[I|0] P_\pi P_\psi \tilde{x}_0$$

where $\lambda$ is an unknown scale factor and K is a 3×3 intrinsic camera calibration matrix.

Determining an object localization cost from 2D bounding box cues 304 A set of tracklets is considered input for the localization, where a tracklet is an object track. The 2D bounding box cost for localization is given by:

$$E_{obj} = \sum_{i=1}^{N} \sum_{t=s_i}^{e_i} (b_i^t - D_i^t)^2$$

where $b_i(t)$ is the 2D projection of the 3D bounding box and $D_i(t)$ is the 2D bounding box from tracking. Given the eight corners of the bounding box, $v_i$, then their projections $q_i$ are:

$$\lambda_i^t \tilde{q}_i^t = K[I|0] P_\pi^t P_\psi^t \tilde{v}_i, \; i=1, \ldots, 8$$

where $\lambda_i^t$ are the homogeneous scale factors. Then define:

$$b_1^t = \min_i p_i^t, \; b_2^t = \min_i p_i^t, \; b_3^t = \min_i q_i^t, \; b_4^t = \max_i q_i^t$$

For a 3D bounding box with vertices $v_1, \ldots, v_8$, the corresponding image points are $q_1, \ldots, q_8$, where each $q_i$ is a 2D pixel on the image plane represented by two numbers, $(p_i, q_i)$.

Object localization cost from object detection cues 306 makes the present embodiments not solely dependent on tracking output. Using s(.) as a function to compute the detection score of a bounding box, the detection term is:

$$E_{det} = \sum_{i=1}^{N} \sum_{t=s_i}^{e_i} \left( \frac{1}{s(b_i^t)} \right)^2$$

where $b_i^t$ is the projection of the respective estimated 3D bounding box.

To build the detection score function s(.) without running the detector, the detection score is computed by fitting a model. The detector provides several candidate bounding boxes and their respective scores. The model is a mixture of Gaussians. At each frame, 4×4 full rank covariance matrices $\Sigma_m$ are estimated centered at $\mu_m$ as:

$$\min_{A_m, \mu_m, \Sigma_m} \sum_{n=1}^{N} \left( \sum_{m=1}^{M} A_m e^{-\frac{1}{2} \epsilon_{mn} \Sigma_m^{-1} \epsilon_{mn}} - \delta_n \right)^2$$

where $\epsilon_{mn} = b_n - \mu_m$, M is the number of objects, and N is the number of candidate bounding boxes, where the dependence on k has been suppressed for the sake of convenience. $A_m$ is the amplitude of the Gaussian, $\mu_m$ is the Gaussian's mean, $\epsilon_{mn}$ is the distance from the mean, $\Sigma_m$ is the covariance, and $\delta_n$ is a score approximated by this sum of Gaussians.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
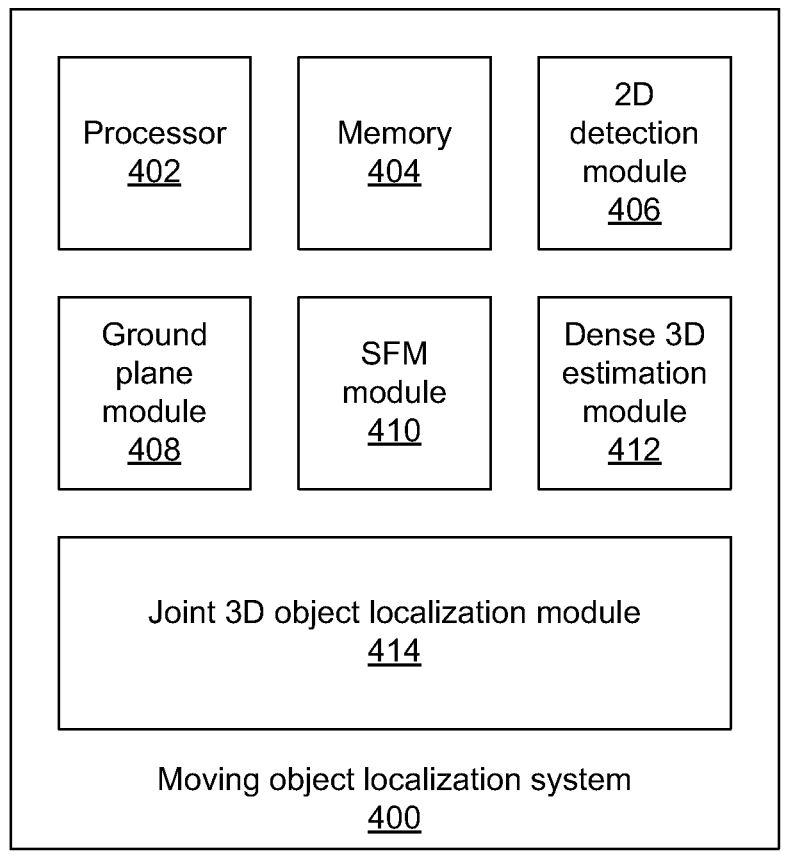
FIG. 4 is a block diagram of a moving object localization system in accordance with the present principles.

Referring now to FIG. 4, an object localization system 400 is shown. A hardware processor 402 accesses video data stored in a memory 404 to provide location information. A 2D detection module 406 uses the processor 402 to perform two-dimensional object detection on the video while the SFM module 410 performs real-time monocular SFM. The ground plane module 408 estimates a ground plane for objects in a frame using the 2D object detection information and the SFM information. Block 412 performs dense 3D estimation using the processor 402. The joint 3D object localization module uses information from the ground plane module 408 and the dense 3D estimation module 412 to provide object location information.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A and Appendix B to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for moving object localization, comprising:
    estimating a ground plane in a video frame based on a detected object within the video frame and monocular structure-from-motion (SFM) information;
    computing object pose for objects in the frame based on the SFM information using dense feature tracking; and
    determining a three-dimensional location for the detected object based on the estimated ground plane and the computed object pose;
    wherein determining the three-dimensional location comprises a Levenberg-Marquardt optimization that finds a three-dimensional bounding box that minimizes a cost function;
    wherein the cost function is:

$$\epsilon = \epsilon'_{SFM} + \lambda_o \epsilon'_{obj} + \lambda_p \epsilon'_{prior}$$

where $\epsilon'_{SFM}$ is a cost from SFM, $\epsilon'_{obj}$ is a cost from object bounding boxes, $\epsilon'_{prior}$ is a prior from the combined smoothness and object size priors, and $\lambda_o$ and $\lambda_p$ are weighting coefficients.

2. The method of claim 1, wherein determining the three-dimensional location for the detected object is based on SFM cues, bounding box cues, and object detection cues.

3. The method of claim 1, wherein dense feature tracking comprises determining an object pose based on dense intensity alignment and tracking dense features based on an epipolar guided optical flow.

4. The method of claim 1, wherein motion segmentation and complex inference are not used to speed object localization.

5. A non-transitory storage medium with instructions enabling a computer to carry out the following,
    estimating a ground plane in a video frame based on a detected object within the video frame and monocular structure-from-motion (SFM) information,
    computing an object pose for objects in the frame based on the SFM information using dense feature tracking, and
    determining a three-dimensional location for the detected object based on the estimated ground plane and the computed object pose;
    wherein determining the three-dimensional location comprises using a Levenberg-Marquardt optimization that finds a three-dimensional bounding box that minimizes a cost function;
    wherein the cost function is:

$$\epsilon = \epsilon'_{SFM} + \lambda_o \epsilon'_{obj} + \lambda_p \epsilon'_{prior}$$

where $\epsilon'_{SFM}$ is a cost from SFM, $\epsilon'_{obj}$ is a cost from object bounding, $\epsilon'_{prior}$ is a prior from the combined smoothness and object size priors, and $\lambda_o$ and $\lambda_p$ are weighting coefficients.

6. The non-transitory storage medium of claim 5, wherein the processor is configured to determine the three-dimensional location for the detected object based on SFM cues, bounding box cues, and object detection cues.

7. The non-transitory storage medium of claim 5, wherein the processor is configured to track dense features by determining an object pose based on dense intensity alignment and tracking dense features based on an epipolar guided optical flow.

8. The non-transitory storage medium of claim 5, wherein the processor is configured not to use motion segmentation or complex inference to speed object localization.

* * * * *